March 17, 1936. S. G. STUCKEY 2,033,959
METHOD OF GLASS FEEDING
Filed July 27, 1932
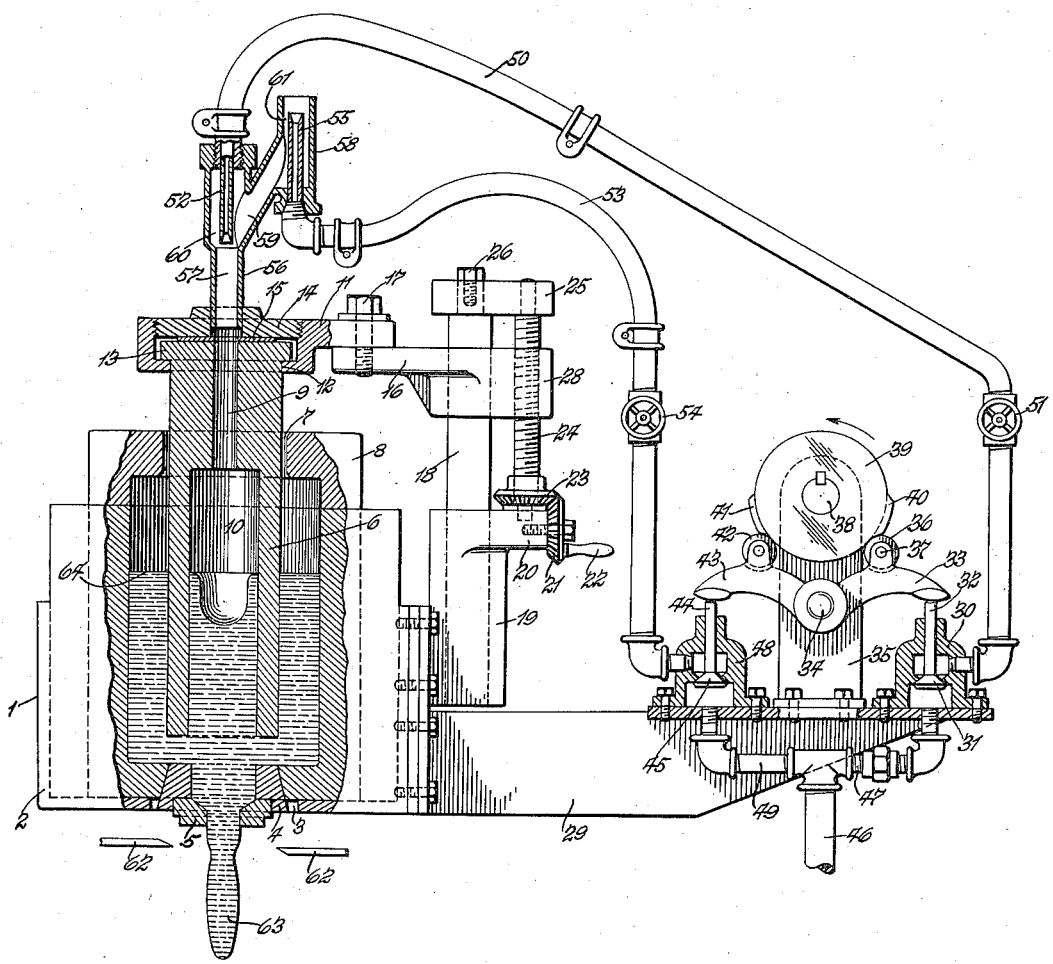
Inventor
Samuel G. Stuckey
By Rippey & Kingsland
His Attorneys.

Patented Mar. 17, 1936

2,033,959

UNITED STATES PATENT OFFICE 2,033,959

METHOD OF GLASS FEEDING

Samuel G. Stuckey, St. Louis, Mo., assignor to Obear-Nester Glass Company, St. Louis, Mo., a corporation of Missouri Application July 27, 1932, Serial No. 624,978

10 Claims. (Cl. 49—55)

This invention relates to the art of feeding molten glass by means of fluid pressures.

This application is a continuation in part of my application, Serial No. 379,099, filed July 18, 1929, now Patent No. 1,916,155 issued June 27, 1933 in which application I have claimed the apparatus hereinafter described.

An object of this invention is to provide means for imparting pulsations of charges of molten glass without the use of pumps.

A further object of this invention is to provide simple and effective means for producing pulsating charges of molten glass.

A further object of this invention is to provide means for producing both superatmospheric and subatmospheric pressures in a bell inverted and immersed in molten glass having its interior continuously open to atmosphere at a point above the level of the glass.

Other and specific objects will be apparent from the detail description of the method.

In order to more fully explain the method of my invention, however, I have chosen to describe it in connection with a preferred form of apparatus which I have found suitable for practicing the invention.

The drawing shows a front elevation partly in section of glass feeding mechanism which may be utilized to practice my invention.

In the drawing I have illustrated apparatus to be used in connection with a forehearth which has an orifice in its bottom wall, over which is placed a bell or tube, open at its bottom end, and which may be used for creating pulsating charges of glass through the orifice in the forehearth by applying different degrees of pressure within the bell. Such a forehearth, with a bell suspended above an orifice at the bottom of the forehearth, and with means for producing superatmospheric and subatmospheric pressures within the bell in order to produce pulsating charges of molten glass through the orifice is known, and this invention resides in the novel method of producing the different pressures in such a bell or tube.

A forehearth 1 is constructed of refractory material supported by an iron frame 2. An opening 3 is formed in the bottom of the frame and a master bushing 4 is positioned in the opening with an outlet orifice ring 5 positioned in an annular recess in the bottom of the bushing 4. A refractory tube or bell 6 extends downwardly through an opening 7 in a cover 8 of the forehearth and its center is placed in alignment with the center of the opening 3. The opening 7 at the top of the forehearth is relatively large in order that the tube 6 may be adjusted to its proper position in respect of the outlet opening. The upper end of the tube 6 is provided with a restricted passage 9 extending into the center 10 of the tube.

The tube 6 is supported at its upper end by a metal arm 11, which is provided with an opening 12 through which the tube is lowered until an annular flange at the top of the tube rests upon an inwardly extending annular flange 13 about the opening 12. The arm 11 is provided with a clamping plate 14, which is threaded into the arm concentric with the opening 12. The clamping plate 14 is so arranged that it may be tightened upon the upper end of the tube 6 with a sealing ring 15 interposed between the clamping plate and the end of the tube.

An elevator arm 16 supports the tube arm 11, to which it is attached by a screw 17. The elevator arm 16 is slidably mounted for movement along a vertical shaft 18, which in turn is fixed to a bracket 19 supported by the frame 2. The upper end of the bracket 19 has a lateral extension 20, on which is journalled a bevel gear 21 having a handle 22. The bevel gear 21 meshes with and is adapted to drive a bevel gear 23 fixed to a vertical screw shaft 24. The screw shaft 24 is supported by and has its lower end journalled in the extension 20 of the bracket 19, and its upper end journalled in a block 25, clamped to the upper end of the guiding shaft 18 by a screw 26.

The outer end of the elevator arm 16 is provided with a boss 28 through which the shaft 24 extends and in which the shaft is threaded. It will be apparent that the vertical position of the tube 6 with respect to the bushing 4 may be varied by turning the bevel gear 21 by means of the handle 22. The tube 6 may be adjusted laterally after loosening the screw 17.

Timing mechanism is provided by means of which two air valves may be operated, thus permitting compressed air to flow through inspirators and expirators, which will later be described in detail, for the purpose of providing superatmospheric and subatmospheric pressures within the tube 6. The timing and valve mechanism may now be described.

The bracket 29 is secured to the frame 2 and carries the timing and valve mechanism. The valve housing 30 is carried by the bracket 29 and has a valve 31 with a stem 32 seated therein. The valve stem 32 extends through the casing and is adapted to be moved by a rocking lever 33 mounted on a stud shaft 34, which in turn is carried by a stand 35. A roller 36 is carried by a pin 37 on the arm 33. A power driven shaft 38 is supported by proper bearings mounted in the upper end of the stand 35 and carries a cam 39 having a lobe 40, which is aligned with the roller 36. Thus by rotation of the shaft 38 and the cam 39, the lobe 40 causes the lever 33 to be depressed, thereby moving the valve 31 off its seat. Another cam lobe 41 is secured to a cam, likewise keyed to the shaft 38, and in alignment with a roller 42 secured to a lever 43. The lever 43 contacts with and is adapted to move a valve stem 44 of a valve 45.

Compressed air, from a source of supply not shown, is received through a pipe 46, whence it is distributed by a pipe 47 to the interior of the valve housing 48, in which the valve 45 is seated, by a pipe 49. A pipe 50 opening into the outlet side of the valve housing 30 is provided with a manually operable throttle valve 51 and extends to and terminates in a compression nozzle 52. A pipe 53 is connected into the outlet side of the valve housing 48 and has a manually operable throttle valve 54. The pipe 53 extends to and terminates in a vacuum nozzle 55. A conduit 56 is connected into the cover plate 14 in line with the central opening 9 in the tube 6 and thereby communicates with the central body portion 10 of the tube. The conduit 56 is of the peculiar conformation shown in the drawing and includes a vertical leg 57 coaxial with the opening 9, a parallel vertical leg 58 and an upwardly inclined portion 59 connecting the upper portion of the leg 57 with the lower portion of the leg 59. The pipe 52 is threaded into the upper end of the leg 57 and the nozzle 52 extends downwardly from the pipe 50 coaxial with the walls of the leg 57 to a point approximately at the lowest point of communication with the inclined portion 59. The nozzle 52 is spaced from the walls of the conduit 56 in such a manner as to leave an annular opening 60 by which the interior of the tube 6 is continuously open to atmosphere. The pipe 53 is threaded into the lower end of the leg 58 and terminates in the nozzle 55 extending coaxial with the walls of the leg 58 and spaced therefrom in order to form an annular space 61 about the wall. Thus it will be seen that the interior of the tube 6 is at all times open to atmosphere through the leg 57, the annular space 61, the inclined member 59 and the annular space 61.

The apparatus is provided with shears, indicated diagrammatically at 62, which are operated in timed relationship with the shaft 38 for the purpose and by means which are well understood in the art.

In practicing the method of this application, glass is permitted to flow from a source of supply, as from a melting furnace, to the forehearth 1, where it assumes a level, as indicated at 64. By reason of the fact that the tube or bell 6 is continuously open to atmosphere, glass will rise within the tube to a level substantially equal to that in the forehearth surrounding the bell. At the same time glass is permitted to flow through the outlet orifice 5 by the force of gravity alone. The direction of the flow of molten glass is under the lower end of the tube and through the orifice 5. As the glass enters about the restricted outlet it flows upwardly into the tube 6, because the supply inlet is much greater than the outlet orifice. It is important to bear in mind that due to back pressure at the outlet orifice the glass will accumulate in the tube 6 and without the assistance of vacuum created in the tube will rise to a level substantially equal to that in the forehearth. With such an arrangement the glass at the orifice may be given an impulse, either by producing a partial vacuum or subatmospheric pressure within the tube 6 and then releasing the pressure, or by producing a positive pressure in the bell, or by a combination of both superatmospheric and subatmospheric pressures in the bell.

Assuming that the device is to be operated by both superatmospheric and subatmospheric pressures in the bell, power is applied to the shaft 38 and the valves 51 and 54 are opened. The cams 39 and 41 are caused to rotate in the direction of the arrow. In the position of the device as shown in the drawing the superatmospheric pressure has been applied within the bell and a charge of glass has been extruded through the orifice 5; the cam lobe 40 has released the lever 33 and the valve 31 is closed; atmospheric pressure has been restored to the bell; and the cam lobe 41 is about to contact the roller 42 which will depress the lever 43, unseating the valve 45, thus permitting air to pass through the pipe 53 thence through the nozzle 55. The nozzle 55 has a relatively small passage which is enlarged at its end so that compressed air will expand and the high velocity of the air discharging from the nozzle 55 will exhaust the air from the conduit 56 and the chamber 10 in the tube 6, thus supplying subatmospheric pressure on the surface of the glass in the tube 6, with the result that the glass below the outlet orifice will be lifted as the shear blades 62 sever the charge 63. The height to which the severed end will be lifted above the shear blades 62 depends upon the seating of the throttle valve 54. After the cam lobe 41 has passed the roller 42, the valve 45 is permitted to close, thus stopping the discharge of air through the nozzle 55, and atmospheric pressure is thereby restored within the tube 6. Under this condition glass will again flow through the orifice 5 by gravity. At the end of the gravity flow period, which is governed by the relative setting of the cams 38 and 39, the cam lobe 40 contacts the roller 36, carried by the lever 33, depressing the valve stem 32 and unseating the valve 31, thus allowing compressed air to pass through the pipe 50 and the nozzle 52. The air released from the nozzle 52 expands and passes at a high velocity through the conduit 56, thus preventing a leakage back through the passage 60. The cam lobe 40 then passes the roller 36, the valve 31 is seated and atmospheric pressure again restored within the tube 6. The cycle is thus completed.

It is to be understood that the relative positions of the cam lobes 40 and 41 may be predetermined and that the throttle valves 51 and 54 may be adjusted in order to give proper impulses to the glass and thus to determine the shaping of the severed mold charges.

The adjustment of the throttle valves 51 and 54 and the adjustment of the cams are not used to effect the adjustment of the weight of the molten charges. This is accomplished by raising and lowering the tube 6, which is done by turning the handle 22.

In practice, an advantage may be gained by eliminating either the superatmospheric or subatmospheric pressure, especially where very hot glass is being handled or very high speed is required. To eliminate subatmospheric pressure it is necessary only to close the throttle valve 54 leaving the throttle valve 51 open. In order to eliminate superatmospheric pressure it is necessary only to close the throttle valve 51, leaving the throttle valve 54 open.

It is obvious that parts of the invention may be used without the whole and that various changes may be made in the details of the method, within the scope of the appended claims, without departing from the spirit of this invention.

I claim:

1. The method of feeding molten glass which includes confining laterally a body of molten glass, maintaining a column of air above said body continuously open to atmosphere, and intermittently inducing a current of air into said air column.

2. The method of feeding molten glass which includes confining laterally a body of molten glass, maintaining a column of air above said body continuously open to atmosphere, and intermittently withdrawing a current of air from said column in such a manner as to reduce the pressure of said air column upon said body of glass.

3. The method of feeding molten glass which includes confining laterally a body of molten glass, maintaining a column of air above said body continuously open to atmosphere, and alternately applying and withdrawing a current of air into and from said column.

4. The method of feeding molten glass which includes confining laterally a column of molten glass in communication with a body of molten glass to be fed at the bottom of said column and in proximity to an outlet orifice for said body, maintaining a column of air above said column of glass continuously open to atmosphere, and producing pulsating charges of glass at the outlet orifice by intermittently introducing a current of air into said column.

5. The method of feeding molten glass which includes confining laterally a column of molten glass in communication with a body of molten glass to be fed at the bottom of said column and in proximity to an outlet orifice for said body, maintaining a column of air above said column of glass continuously open to atmosphere, and producing pulsating charges of glass at the outlet orifice by alternately introducing and withdrawing currents of air into and from said air column.

6. The method of feeding molten glass which includes maintaining a body of molten glass to be fed of substantial depth in communication with a restricted orifice below the level of said body, confining laterally a column of said glass adjacent said orifice, maintaining a column of air above said laterally confined column of glass continuously open to atmosphere, and alternately producing air currents into and from said column of air to alternately vary the pressure upon said laterally confined column of glass above and below atmospheric pressure.

7. The method of feeding molten glass which includes confining a body of molten glass adjacent an orifice, maintaining said column of air in continuous communication with the atmosphere, and alternately increasing and decreasing the pressure of said column of air upon the body of molten glass by flowing currents of air into and from said column of air.

8. The method of feeding molten glass which includes confining laterally a body of molten glass, maintaining a column of air above said body of glass continuously open to atmosphere, intermittently withdrawing currents of air from said column in such a manner as to reduce the pressure of said air column upon said body of glass, and controlling such reduction of pressure by controlling the velocity of said air currents.

9. The method of feeding molten glass which includes confining laterally a body of molten glass, maintaining a column of air above said body continuously open to atmosphere, intermittently projecting currents of air into said column to increase the pressure of said air column upon said body of glass, and controlling such increase of pressure by controlling the velocity of said air currents.

10. The method of feeding molten glass which includes confining laterally a column of molten glass in communication with a body of molten glass to be fed at the bottom of said column and in proximity to an outlet orifice for said body, maintaining a column of air above said column of glass continuously open to atmosphere, producing pulsating extrusion and retraction of the glass at the orifice by alternately applying and withdrawing currents of air into and from said air column, and controlling said extrusion and retraction by controlling the velocity of said air currents.

SAMUEL G. STUCKEY.